(12) United States Patent
Saini et al.

(10) Patent No.: US 11,316,748 B2
(45) Date of Patent: Apr. 26, 2022

(54) METHOD AND SYSTEM FOR GENERATING AND MANAGING VIRTUAL INDUSTRIAL DEVICES IN AN INDUSTRIAL NETWORK

(71) Applicants: Bhupender Kumar Saini, Karnataka (IN); Tanushree Mallya, Karnataka (IN); Sachin Raizada, Karnataka (IN); Vinay Kumar Tiwari, Fürth (DE)

(72) Inventors: Bhupender Kumar Saini, Karnataka (IN); Tanushree Mallya, Karnataka (IN); Sachin Raizada, Karnataka (IN); Vinay Kumar Tiwari, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/453,334

(22) Filed: Jun. 26, 2019

(65) Prior Publication Data
US 2019/0394098 A1    Dec. 26, 2019

(30) Foreign Application Priority Data
Jun. 26, 2018  (EP) .................................. 18179857

(51) Int. Cl.
*H04L 12/24* (2006.01)
*H04L 12/26* (2006.01)
(Continued)

(52) U.S. Cl.
CPC ........ *H04L 41/145* (2013.01); *H04L 41/0846* (2013.01); *H04L 43/04* (2013.01); *H04L 41/22* (2013.01)

(58) Field of Classification Search
CPC ... H04L 41/145; H04L 41/0846; H04L 43/04; H04L 41/22; H04L 41/04; H04L 41/0631;
(Continued)

(56) References Cited

U.S. PATENT DOCUMENTS 8,185,871 B2 * 5/2012 Nixon ...................... G06F 8/34
                                                              717/121
8,547,974 B1 * 10/2013 Guruswamy ......... H04L 43/026
                                                              370/389
(Continued)

OTHER PUBLICATIONS

European Search Report for European Patent Application No. 18179857.0-1224 dated Jan. 7, 2019.

*Primary Examiner* — Chi H Pham
*Assistant Examiner* — Ji-Hae Yea
(74) *Attorney, Agent, or Firm* — Lempia Summerfield Katz LLC

(57) ABSTRACT

A method and system for generating and managing virtual industrial devices in an industrial network is disclosed. The method includes capturing data packets associated with an ongoing industrial communication between an industrial application and an industrial device. The method further includes segregating the captured data packets into one or more requests and the one or more responses by analyzing information included in the data packets. The method also includes storing the one or more requests along with the one or more responses for the ongoing industrial communication in memory. The method includes dynamically generating a virtual industrial device emulating the industrial device based on the stored one or more requests and the stored one or more responses. The method includes establishing a communication session between the generated virtual industrial device and the industrial application for performing one or more test operations on the generated virtual industrial device.

17 Claims, 12 Drawing Sheets

(51) Int. Cl.
*H04L 41/14* (2022.01)
*H04L 41/084* (2022.01)
*H04L 43/04* (2022.01)
*H04L 41/22* (2022.01)

(58) Field of Classification Search
CPC ....... H04L 43/08; H04L 67/141; H04L 69/22; G06F 11/3668; G06F 9/45; G06F 11/3652; H04M 3/28
See application file for complete search history.

(56) References Cited

U.S. PATENT DOCUMENTS

| | | | |
|---|---|---|---|
| 2005/0172258 A1* | 8/2005 | Nixon | G06F 8/34 717/100 |
| 2007/0233438 A1* | 10/2007 | Quimper | G05B 23/0278 703/6 |
| 2009/0132225 A1 | 5/2009 | Safabakhsh | |
| 2014/0223418 A1* | 8/2014 | Michelsen | G05B 23/0278 703/6 |
| 2015/0268975 A1* | 9/2015 | Du | G06F 9/455 703/23 |
| 2016/0021149 A1* | 1/2016 | Maistri | H04L 65/80 348/14.08 |

* cited by examiner

FIG 11B

METHOD AND SYSTEM FOR GENERATING AND MANAGING VIRTUAL INDUSTRIAL DEVICES IN AN INDUSTRIAL NETWORK

PRIORITY

This application claims the benefit of European Patent Application No. 18179857.0, filed on Jun. 26, 2018, which is hereby incorporated by reference in its entirety.

FIELD OF TECHNOLOGY

The present embodiments relate to a field of testing environment, and more particularly, relates to a method and system for generating and managing virtual industrial devices in an industrial network.

BACKGROUND

Typically, testing of functionally complex systems involves a set of activities such as test planning, system analysis, creation of test cases, execution of test cycles, and final testing. Especially in the field of software testing, testing activities typically occur before a system is implemented into a target environment. The goal of system testing is to determine if a system meets the requirements that guided design and development of the system, works as expected, and may be implemented in a target environment with the desired functionality. System tests are usually referred as black box tests of a fully integrated system made up of software, controlled hardware, and a technical process. These tests include manual manipulations of the actual hardware or technical process that may not be performed by the software. Many steps currently performed in system testing require a testing operator to stimulate the system and validate behavior of the system. In industrial automation, scale and structure complexity of these systems, specialized non-functional requirements, and hardware-related issues make validation of these systems even more challenging and costly.

One of the major hardware-related challenges during software testing is the availability of test infrastructure. The availability of test infrastructure is a major factor in development project costs. Effective system testing requires that the system under test runs in an environment as alike as possible to a production site. However, in some occasions, hardware is not even available in early product development life cycle, which makes hardware inaccessible to software developers. As a consequence, access to hardware for each software developer and software tester is limited. Another important hardware-related challenge during software testing is hardware fault conditions. With a large amount of hardware units in industrial systems, it is important to consider the hardware failures for each of these hardware units. However, it becomes difficult to generate specific hardware fault conditions or to generate anomaly loads in real time for these hardware units. It is also difficult to identify the root causes of failures in the operational environment and recreate a failure scenario for a large complex industrial system. For example, for executing boundary value analysis of motor related parameters such as current, voltage, and power in a software testing application, a tester and developer is to run a motor with maximum load. Unfortunately, if the hardware required for carrying out such tests are not available and are costlier to afford, then the tester/developer is to wait until the required hardware is made available. Further, as the tester/developer has no direct control over the hardware units, all hardware diagnostic information related to hardware failure may not be validated with the software testing application.

Due to the above-mentioned hardware related challenges faced during software testing, major functional and non-functional aspects of the software remain untested, thereby leading to increased risk of failure in real-time environment, and increased cost.

SUMMARY AND DESCRIPTION

A method and system for generating and managing virtual industrial devices in an industrial network are disclosed.

In one aspect, a method for generating and managing one or more virtual industrial devices in an industrial network is disclosed. The method includes capturing data packets associated with an ongoing industrial communication in the industrial network between an industrial application and an industrial device. In an embodiment, the industrial device includes industrial controlling/monitoring devices. In an alternate embodiment, the industrial devices include field devices, controllers, or the like. In an embodiment, the industrial application includes automation engineering application. The method further the method includes segregating the captured data packets into one or more requests and corresponding one or more responses by analyzing information included in the data packets. The request includes a request header including one or more parameters. The response includes a response header corresponding to the request header and a device data. The information included in the data packets includes type of data packet, type of request, source address, destination address, port number, protocol identifier (ID), length of header, length of user data, sequence number, session identifier (ID), index, and one or more parameters associated with the data packets. The method also includes storing the one or more requests along with the one or more responses for the ongoing industrial communication in a memory. The method also includes dynamically generating one or more virtual industrial devices emulating the industrial device based on the stored one or more requests and the stored one or more responses. Additionally, the method includes establishing a communication session between the one or more generated virtual industrial devices and the industrial application for performing one or more test operations on the one or more generated virtual industrial devices. The one or more test operations include generating faults for the industrial device, testing one or more scenarios for the industrial device, and controlling parameters associated with the industrial device.

In dynamically generating the one or more virtual industrial devices for the industrial device based on the stored one or more requests and the stored one or more responses, the method includes obtaining device configuration information associated with the industrial device from the one or more requests and the one or more responses. Further, the method includes dynamically generating the one or more virtual industrial devices to emulate as the industrial device based on the obtained device configuration information.

In storing the one or more requests along with the one or more responses for the ongoing industrial communication in the memory, the method includes generating a communication library for storing the one or more requests along with the one or more responses in the memory. The communication library stores the one or more requests along with the one or more responses for each industrial device in communication with the industrial application.

In establishing the communication session between the one or more generated virtual industrial devices and the industrial application for performing the one or more test operations on the one or more generated virtual industrial devices, the method includes identifying a port number in the request for establishing communication with the industrial application. Further, the method includes determining whether the ongoing industrial communication between the industrial device and the industrial application is complete. Also, the method includes establishing the communication session between the one or more generated virtual industrial devices and the industrial application when the ongoing industrial communication between the industrial device and the industrial application is complete.

In determining whether the ongoing industrial communication between the industrial device and the industrial application is complete, the method includes terminating the ongoing industrial communication between the industrial device and the industrial application before establishing the communication session between the one or more generated virtual industrial devices and the industrial application.

The method further includes determining whether a request is received from the industrial application. The request is received on a specific port number and the request includes one or more parameters. The method further includes determining whether the received request matches with at least one pre-stored requests based on the one or more parameters included in the received request. Further, the method includes retrieving the matched pre-stored request along with the corresponding pre-stored response for the received request from a memory. Further, the method includes identifying one or more modified parameters in the received request by comparing the one or more parameters in the received request with the one or more parameters in the matched pre-stored request. The one or more modified parameters includes an activity identifier, a session identifier, the port number, a sequence number, a protocol name, a protocol ID, type of request, data length, and index. The method also includes generating a response for the received request by modifying the pre-stored response based on the identified one or more modified parameters. Additionally, the method includes transmitting the generated response to the industrial application via the industrial network, where the response is transmitted via the specific port number.

In determining whether the received request matches with at least one pre-stored requests, the method includes storing the received request in the memory if the received request fails to match with the at least one pre-stored requests and outputting a notification on a user interface. The notification indicates that the received request is stored in the memory. In an embodiment, the notification may be in the form of an email message, an alert window, signal information, a text message, and the like.

In generating the response for the received request by modifying the pre-stored response based on the identified one or more modified parameters, the method includes modifying the pre-stored response based on user-defined parameters and the identified one or more modified parameters. The method also includes generating the response for the received request. The response includes one or more modified parameters and the user-defined parameters. The user-defined parameters include one or more parameters associated with device data present in the pre-stored response.

In another aspect, a method for managing one or more virtual industrial devices in an industrial network is disclosed. The method includes receiving a response from a virtual industrial device via the industrial network. Further, the method includes analyzing one or more parameters included in the response. The method further includes modifying information associated with the virtual industrial device based on the analyzed one or more parameters. Further, the method includes displaying the modified information associated with the virtual industrial device on a user interface.

In another aspect, an apparatus for generating and managing one or more virtual industrial devices in an industrial network is disclosed. The apparatus includes a processor and a memory coupled to the processor. The memory includes a virtual industrial device management module stored in the form of machine-readable instructions executable by the processor. The virtual industrial device management module is capable of performing the method acts described above.

In yet another aspect, a computer-program product, having machine-readable instructions stored therein, is provided. The machine-readable instructions, when executed by the processor, causes the processor to perform method acts as described above is disclosed.

In yet another aspect, an engineering system for managing virtual industrial devices in an industrial network is disclosed. The engineering system includes a memory and a processor coupled to the memory. The processor executes programmed instructions stored in the memory (e.g., to perform method acts as described above).

In another aspect, an industrial communication system for generating and managing virtual industrial devices in an industrial network is disclosed. The industrial communication system includes an apparatus capable of generating and managing virtual industrial devices in an industrial network, an engineering system for managing the virtual industrial devices in the industrial network, and an industrial device communicatively coupled to the engineering system for managing the virtual industrial devices in the industrial network.

In yet another aspect, a non-transitory computer-readable storage medium, having machine-readable instructions stored therein, is provided. The machine-readable instructions, when executed by at least one processor, cause the processor to perform the method acts described above.

The above-mentioned and other features of the invention will now be addressed with reference to the accompanying drawings of the present disclosure. The illustrated embodiments are intended to illustrate but not limit the invention.

BRIEF DESCRIPTION OF THE DRAWINGS

The present disclosure is further described hereinafter with reference to illustrated embodiments shown in the accompanying drawings, in which:

FIGS. 11A-B show a screenshot view of a graphical user interface of an engineering system that enables a user to manage virtual industrial devices in the industrial network.

DETAILED DESCRIPTION

Figure 1:
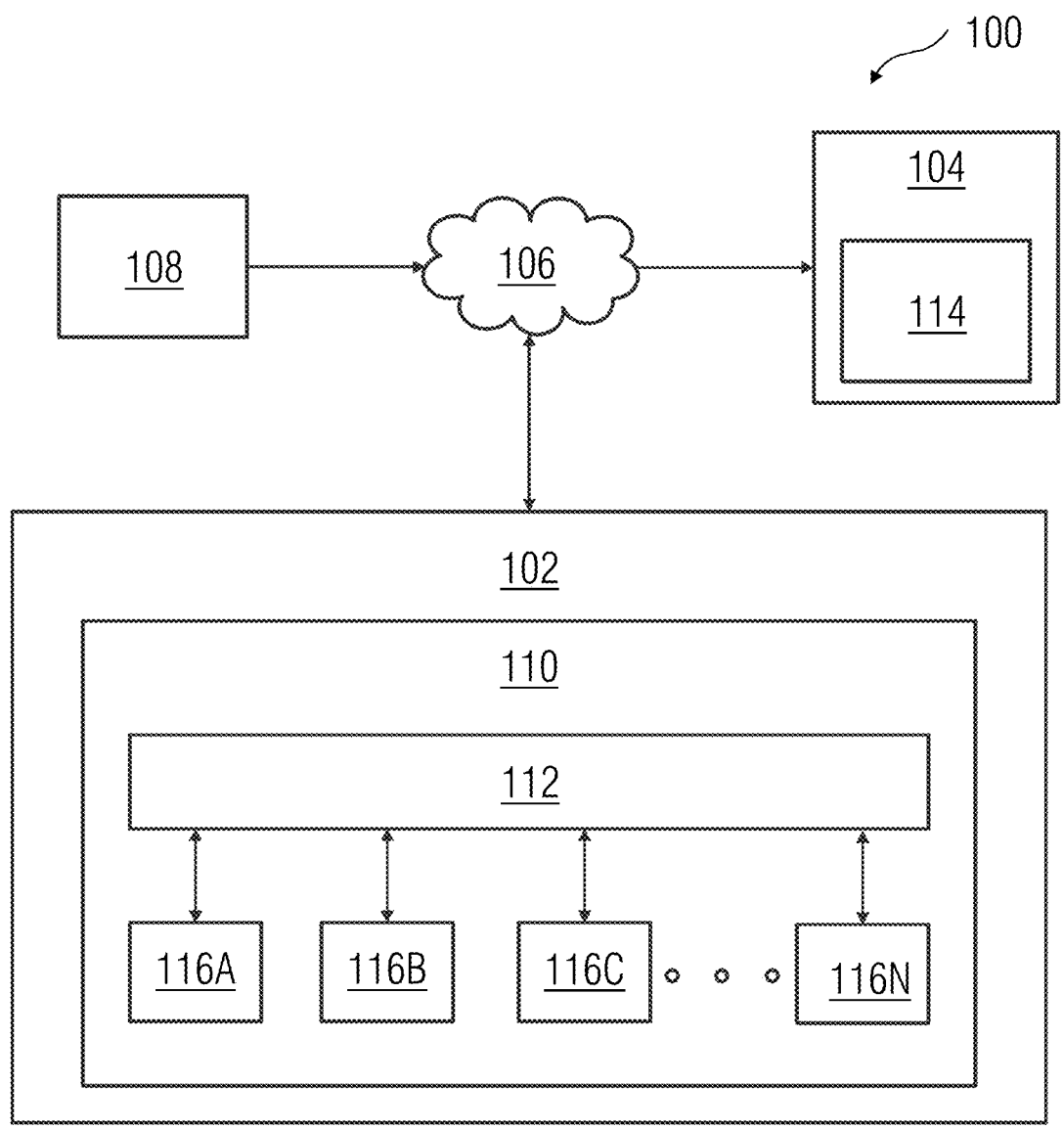
FIG. 1 is a schematic representation of an industrial communication system capable of generating and managing virtual industrial devices in an industrial network, according to an embodiment.

A method and system for generating and managing virtual industrial devices in an industrial network are disclosed. Various embodiments are described with reference to the drawings, where like reference numerals are used to refer the drawings and like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a schematic representation of an industrial communication system 100 capable of generating and managing virtual industrial devices 116A-N in an industrial network, according to an embodiment of the present disclosure. In FIG. 1, the industrial communication system 100 includes a testing system 102, an engineering system 104, and an actual industrial device 108. The engineering system 104 communicates with the actual industrial device 108 and the testing system 102 via an industrial network 106.

The testing system 102 may be any computing systems known in the art for implementing a virtual test environment 110. For example, the testing system 102 may be dedicated testing systems or general purpose computing devices such as industrial automation systems. Alternatively, the testing system 102 may be a part of an engineering system, such as the engineering system 104 including the virtual test environment 110 for generating and managing the virtual industrial devices 116A-N. This may be achieved by using loopback addresses for PROFINET communication and a null emulator for serial communication. The virtual test environment 110 thus does not require any external hardware and is quicker than conventional mechanisms. The virtual test environment 110 enables automatically verifying behavior of the actual industrial device 108 without communicating with the actual industrial device 108. The virtual test environment 110 enables the user to detect the status of the actual industrial device 108 in the industrial network 106. The terms "actual industrial device 108" and "the industrial device 108" are used interchangeably throughout the specification. The components of the testing system 102 are further explained in FIG. 3.

The virtual test environment 110 includes a virtual industrial device management module 112 for generating and managing the virtual industrial devices 116A-N. The virtual industrial device management module 112 is stored in the form of machine-readable instructions and executable by the testing system 102 through the virtual test environment 110.

The one or more virtual industrial devices 116A-N replace the actual industrial device 108 and is configured for communicating with the industrial application 114 through a fixed port number. The one or more virtual industrial devices 116A-N enable the user to change one or more parameters associated with the actual industrial device 108 and generate relevant test scenarios for the actual industrial device 108.

The engineering system 104 includes an industrial application 114 for representing engineered devices or other objects and to perform one or more control operations over the engineered devices or other objects. The engineering system 104 is any general-purpose computer capable of implementing the industrial application 114. In an embodiment, the industrial application 114 may be an automation engineering application, such as a total integrated automation (TIA) portal or any other known automation engineering application. The industrial application 114 enables a user to run a plurality of test scenarios for the industrial device 108. The industrial application 114 also enables the user to generate specific hardware faults for the industrial device 108 without actually communicating with the industrial device 108. This is done by using the virtual industrial devices 116A-N. Further, the industrial application 114 uses the virtual test environment 110 for monitoring the industrial device 108 to detect intrusion, behavior of the industrial device 108, safety and performance of the industrial network 106, and act as a load generator to observe the behavior of the industrial device 108 in the industrial network 106.

The actual industrial device 108 may be an industrial controlling or monitoring devices, such as, for example, SIMOCODE. In an embodiment, the actual industrial device 108 may include an industrial field device. The industrial field device may be a converter, a motor starter, and an input/output module, or an actuator. The industrial field device may transmit field data (e.g., measurement data) to the industrial application 114. The field data transmitted from the field devices to the central control unit may include measurement data of physical quantities. The field data may also describe a state of at least one of the field devices (e.g., the field data may also include a current value of an algorithm-parameter or a mode identity value describing the mode that a field device is currently running in). Another example of a field device is a sensor device. In one embodiment, the actual industrial device 108 is an industrial controlling or monitoring device configured for communicating the field data associated with one or more field devices to the industrial application 114 in response to a request received from the industrial application 114. The communication between the industrial device 108 and the industrial application 114 takes place via a fixed port number.

Figure 2:
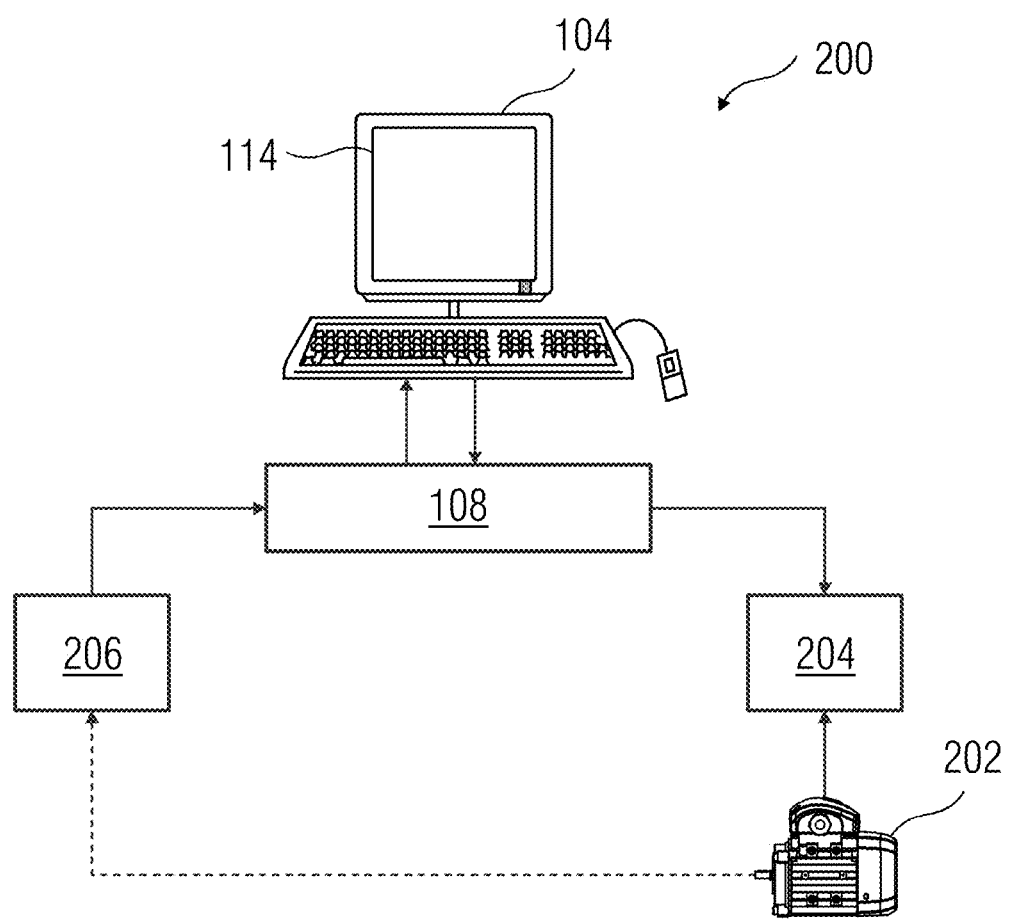
FIG. 2 is a schematic representation of a plant simulation diagram in a test environment, according to the embodiment.

FIG. 2 is a schematic representation of a plant simulation diagram 200 in a test environment, according to an embodiment of the present disclosure. Specifically, FIG. 2 describes communication between the field device 202 and the engineering system 104 via the industrial device 108. In FIG. 2, the field device 202 is communicatively coupled to the industrial device 108 for exchanging information associated with the field device 202 and enabling the industrial device 108 to control the field device 202 via an actuator 204. The information associated with the field device 202 may include field parameters. These field parameters are read by the industrial device 108 through sensors 206. Upon obtaining the field parameters, the industrial device 108 communicates these field parameters to the industrial application 114 running on the engineering system 104.

The industrial device 108 communicates with the engineering system 104 via a communication protocol such as, for example, PROFINET, PROFIBUS and SERIAL communication. The industrial device 108 stores the information associated with the field device 202 in a particular memory location of fixed data length (e.g., data sets). Information stored in the respective data sets in form of Byte/Bit is according to the fixed data length. For example, if a user at the industrial application 114 wishes to view the information stored at the industrial device 108, a particular data set corresponding to the information stored may be read. For example, data set 92 stores diagnostic information in the industrial device 108. This facilitates the present disclosure in accessing all device information by capturing data packets of ongoing industrial communication between the industrial device 108 and the industrial application 114. In an exemplary embodiment, when particular data set information of the field device 202 is requested by the industrial application 114 to the industrial device 108, the industrial device 108 determines a value of the requested particular data set information from the captured request and response data packets. The industrial device 108 retrieves the corresponding information associated with the requested data set and correspondingly responds back to the industrial application 114 with the retrieved corresponding information. Data set information is fixed in each data packet.

In an embodiment, industrial communication between the industrial device 108 and the industrial application 114 may include, but is not limited to, either SERIAL communication, or PROFINET or PROFIBUS communication. The data packet exchanged between the industrial device 108 and the industrial application 114 during basic SERIAL communication includes length of data packet, length of user data, data set information, and a check sum bit. Alternatively, data packet exchanged between the industrial device 108 and the industrial application 114 during PROFINET communication includes information such as MAC address of source and destination terminals, IP addresses and the like. Detailed content of the data packet for SERIAL communication and PROFINET communication is known to a person skilled in the art. In an embodiment, the request data packet and the response data packet may include almost same information except few parameters like request data type and the response data packet including additional device data associated with the field device 202. Further, the industrial device 108 always communicates with the industrial application 114 on a single port number.

Figure 3:
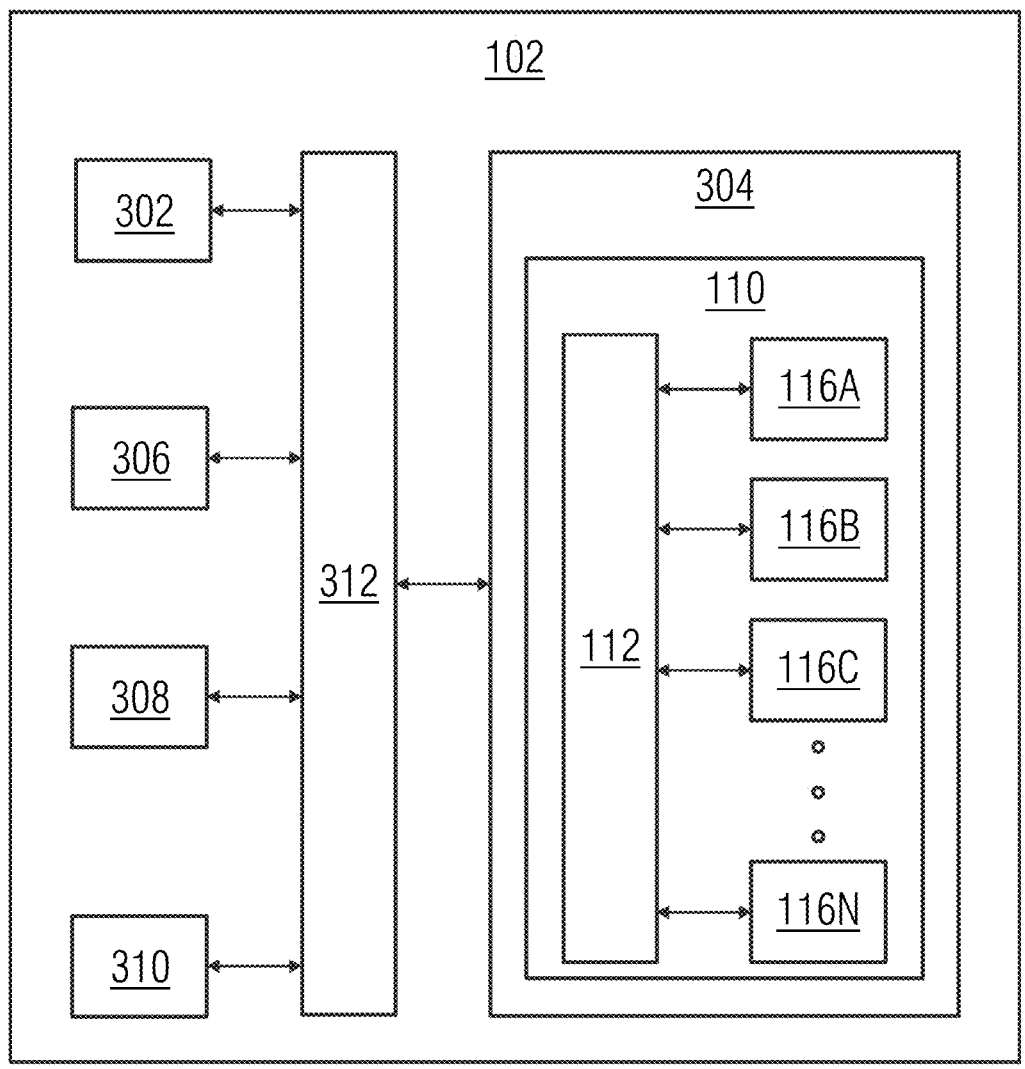
FIG. 3 is a block diagram of a testing system, such as those in shown in FIG. 1, showing various components to implement embodiments.

FIG. 3 is a block diagram of a testing system 102, such as those in shown in FIG. 1, showing various components to implement embodiments of the present disclosure. The testing system 102 includes a processor 302, a memory 304, a storage unit 306, an input-output unit 308, a communication interface 310, and a bus 312.

The processor 302, as used herein, may be one or more processing units (e.g., servers) capable of processing requests from the engineering system 104. The processor 302 may also include embedded controllers, such as generic or programmable logic devices or arrays, application specific integrated circuits, or field programmable gate arrays (FPGAs) and the like. The memory 304 may be volatile memory and non-volatile memory. The memory 304 includes a virtual industrial device management module 112 for generating and managing virtual industrial devices 116A-N based on industrial communication information, according to one or more embodiments described herein. Memory elements may include any suitable memory devices for storing data and machine-readable instructions.

The virtual industrial device management module 112 may be stored in the form of machine-readable instructions on any of the above-mentioned storage media and may be executed by the processor 302. In one embodiment, the program may be included on a compact disk-read only memory (CD-ROM) and loaded from the CD-ROM to a hard drive in the non-volatile memory.

For example, a computer program may include machine-readable instructions that when executed by the processor 302, may cause the processor 302 to capture data packets associated with an ongoing industrial communication in the industrial network between the industrial application 114 and the industrial device 108. The industrial device 108 includes at least one of an industrial field device and an industrial controlling device. Further, the computer program may include machine-readable instructions that when executed by the processor 302, may cause the processor 302 to segregate the captured data packets into one or more requests and corresponding one or more responses by analyzing information included in the data packets. The information included in the data packets includes type of data packet, packet identifier (ID), session identifier (ID), sequence number, index, and one or more parameters associated with the data packets. Further, the computer program may include machine-readable instructions that when executed by the processor 302, may cause the processor 302 to store the one or more requests along with the one or more responses for the ongoing industrial communication in the memory 304. The computer program may also include machine-readable instructions that when executed by the processor 302, may cause the processor 302 to dynamically generate virtual industrial devices 116A-N emulating the industrial devices 108 based on the stored one or more requests and the stored one or more responses. Additionally, the computer program may include machine-readable instructions that when executed by the processor 302, may cause the processor 302 to establish a communication session between the generated virtual industrial devices 116A-N and the industrial application 114 for performing one or more test operations on the generated virtual industrial devices 116A-N. The one or more test operations includes generating faults for the industrial device 108, testing one or more scenarios for the industrial device 108, and controlling parameters associated with the industrial device 108.

The storage unit 306 is configured for storing data packets associated with the ongoing industrial communication between the industrial application 114 and the industrial device 108. Further, the storage unit 306 is configured for storing a communication library including the one or more requests along with the corresponding one or more responses. The communication library stores the one or more requests along with the one or more responses for each industrial device 108 in communication with the industrial application 114. The communication interface 310 is configured for establishing communication sessions with the industrial application 114. The bus 312 acts as interconnect between various components of the testing system 102. The component such as the input/output device 308 is well known to the person skilled in the art and hence the explanation is thereof omitted.

Figure 4:
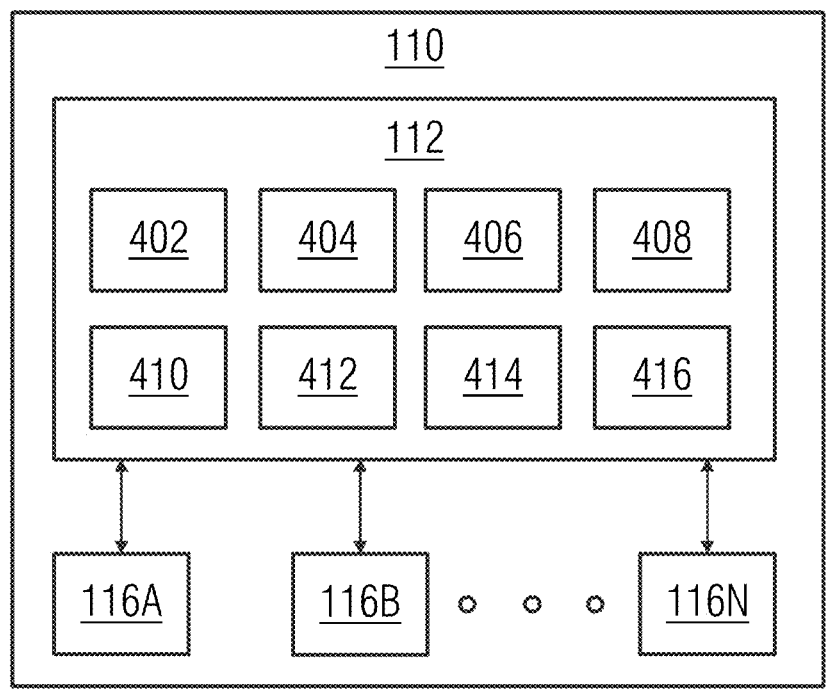
FIG. 4 is a detailed view of a virtual industrial device management module such as those shown in FIG. 1, according to the embodiment.

FIG. 4 is a detailed view of a virtual industrial device management module 112 such as those shown in FIG. 1, according to the embodiment of the present disclosure. The virtual industrial device management module 112 includes a packet sniffing module 402, a packet filtering and analyzing module 404, an industrial communication database 406, a virtual industrial device generating module 408, a communication module 410, a device parameter processing module 412, a data packet generating module 414, and a display module 416.

The packet sniffing module 402 is configured for capturing data packets associated with an ongoing industrial communication in the industrial network 106 between the industrial application 114 and the industrial device 108. The data packets may be captured by any sniffing tool known in the art, such as but not limited to PROFIBUS analyzer, SERIAL port monitoring tool, and wireshark for PROFINET. The captured data packets are then sent to the packet filtering and analyzing module 404. In an embodiment, for capturing the data packets, it is to be provided that the engineering system 104 and the industrial device 108 are connected on a same industrial network 106. At the industrial application 114, the actions such as upload, open all online diagnostics dialogue that depict device, and motor parameter are performed. These actions are performed to obtain all device information at the start and thus reduce the chance of receiving no response from the virtual industrial devices 116A-N being generated.

The packet filtering and analyzing module 404 is configured for segregating the captured data packets into one or more requests and the one or more responses by analyzing information included in the data packets. The information included in the data packets may include type of data packet, packet identifier (ID), session identifier (ID), sequence number, index, and one or more parameters associated with the data packets. The one or more parameters may include protocol ID, protocol name, type of request, index (dataset), and other parameters. Other parameters may include any parameters known in the art. The packet filtering and analyzing module 404 uses byte address and length of each parameter for analyzing the captured data packets, considering that the packet structure of protocols are predefined by the user. An exemplary protocol structure for a particular protocol may be as shown in Table 1 below:

TABLE 1

An exemplary protocol structure
Protocol structure of PNIO-CM

| Name of Parameter | Byte Address | Length (Byte) |
| --- | --- | --- |
| PNIO_uuid | 24 | 16 |
| Object UUID | 40 | 16 |
| Activity ID | 56 | 16 |
| Arruid ID | 108 | 16 |
| Type of request | 100 | 2 |
| Index | 132 | 2 |
| User specified data | 164 | Data length |
| Data length | 134 | 4 |
| Sequence number | | |

It is assumed that other parameters not shown above are known to a person skilled in the art.

The packet filtering and analyzing module 404 first obtains the one or more parameters associated with the data packets, analyzes the one or more parameters associated with the data packets, and then segregates the captured data packets into request data packets and the response data packets based on the one or more parameters.

The information included in the data packets may also include, but is not limited to, protocol ID, and protocol name. An exemplary list of protocols is depicted in the Table 2 below:

TABLE 2

Exemplary list of protocols

| Protocol name | Protocol ID |
| --- | --- |
| PNIO_CM | "01-00-a0-de-97-6c-d1-11-82-71-00-a0-24-42-df-7d" |
| EPM Protocol | "08-83-AF-E1-1F-5D-C9-11-91-A4-08-00-2B-14-A0-FA" |
| . . . | . . . |

The packet filtering and analyzing module 404 further is configured to filter out duplicate data packets and data packets of which the protocols are unsupported.

The industrial communication database 408 is configured for storing the segregated one or more requests along with the one or more responses for the ongoing industrial communication. The one or more requests and the corresponding one or more responses are stored as lookup tables in the industrial communication database 408. These lookup tables has all parameters associated with the one or more requests and the corresponding one or more responses. Further, the industrial communication database 408 is configured for generating a communication library for storing the one or more requests along with the corresponding one or more responses. The communication library stores the one or more requests along with the one or more responses for each industrial device 108 in communication with the industrial application 114. The communication library includes all requests and responses for the industrial communication between the industrial device 108 and the industrial application 114.

Further, the industrial communication database 408 is configured for storing information associated with all generated virtual industrial devices 116A-N. The information associated with all generated virtual industrial devices 116A-N may include device configuration information associated with each virtual industrial device 116A-N, user-defined parameters of the virtual industrial devices 116A-N, and communication information for each of the virtual industrial devices 116A-N, such as the network type, network status, port number, and the like.

The virtual industrial device generating module 408 is configured for dynamically generating virtual industrial devices 116A-N emulating the industrial device 108 based on the stored one or more requests and the stored one or more responses. Specifically, the virtual industrial device generating module 408 is configured for obtaining device configuration information associated with the industrial device 108 from the one or more requests and the one or more responses and dynamically generating the virtual industrial devices 116A-N to emulate as the industrial device 108 based on the obtained device configuration information. In an embodiment, the virtual industrial device generating module 408 identifies the type of the industrial device 108 in communication with the industrial application 114 based on the one or more parameters included in the data packets. Once the type of the industrial device 108 is identified, device configuration information of the identified industrial device 108 is obtained from the industrial communication database 406. A virtual industrial device 116A-N emulating the industrial device 108 is then generated by configuring the same one or more parameters as that of the industrial device 108. Hence, the industrial device 108 is now completely virtualized with the generated virtual industrial devices 116A-N. Each virtual industrial device 116A-N thus generated may emulate a corresponding industrial device 108. Each virtual industrial device 116A-N is linked to a corresponding communication library stored in the industrial communication database 406, thus enabling the industrial application 114 to manage all data related to each virtual industrial device 116A-N. Upon generating the virtual industrial devices 116A-N, the virtual industrial device generating module 408 triggers the communication module 414 to establish a session with the industrial application 114.

The communication module 410 is configured for establishing a communication session between the generated virtual industrial devices 116A-N and the industrial application 114 for performing one or more test operations on the generated virtual industrial devices 116A-N. The one or more test operations include generating faults for the industrial device 108, testing one or more scenarios for the industrial device 108, and controlling parameters associated with the industrial device 108. In order to establish the communication session between the generated virtual industrial devices 116A-N and the industrial application 114, the communication module 410 is configured for first identifying a port number in the request for establishing communication with the industrial application 114. The port number is indicated as one of the parameters in the request received from the industrial application 114. This port number is used by the industrial application 114 and the industrial device 108 for communication. Hence, it is important for the generated virtual industrial devices 116A-N to communicate with the industrial application 114 via that fixed port number for successful communication.

Upon identifying the port number, the communication module 410 is configured for determining whether the ongoing industrial communication between the industrial device 108 and the industrial application 114 is complete. This is to provide that the industrial application 114 does not communicate with the industrial device 108 and the virtual industrial devices 116A-N at the same time. If the ongoing industrial communication between the industrial device 108 and the industrial application 114 is determined to be complete, then the communication module 410 is configured for establishing the communication session between the generated virtual industrial devices 116A-N and the industrial application 114. In an alternate embodiment, the communication module 410 is configured for terminating the ongoing industrial communication between the industrial device 108 and the industrial application 114 before establishing the communication session between the generated virtual industrial devices 116A-N and the industrial application 114.

In an exemplary embodiment, an IP address of the virtual industrial devices 116A-N and the industrial application 114 may be used for establishing the communication session. This communication session is then to be according to the standard TCP/IP communication protocols known in the art.

In an embodiment, at the time of communicating with the industrial application 114, the industrial application 114 is configured with a loopback address or IP address of same network where the virtual industrial device(s) 116A-N is running. Upon establishing the communication session, data packets are exchanged between the industrial application 114 and the virtual industrial device(s) 116A-N.

In an embodiment, in case of encrypted communication, such as, for example, secure socket layer/Transport layer security, if encryption key and/or certificate is provided by the user, then the communication module 410 is configured for processing and analyzing encrypted packets that are then forwarded to packet sniffing module 402. The rest of the process remains the same as in the case of unencrypted communication. In such cases, the communication module 410 acts as a data encryption/decryption module.

The device parameter processing module 412 is configured for determining whether a request is received from the industrial application 114. The request is received on a specific port number, and the request includes the one or more parameters. In an embodiment, once the virtual industrial devices 116A-N for the industrial device 108 is generated and a communication session is established between the virtual industrial devices 116A-N and the industrial application 114, the identified port number is kept open for determining if there are any requests received from the industrial application 114. If any requests are received, then the request is to go through the packet sniffing module 402 and the packet filtering and analyzing module 404. The packet filtering and analyzing module 404 forwards the received request to the device parameter processing module 412 after processing.

The device parameter processing module 412 is then configured for determining whether the received request matches with at least one of the pre-stored requests based on the one or more parameters included in the received request. The received request is compared to the pre-stored requests in the industrial communication database 408. For example, the one or more parameters in the received request are compared with one or more parameters of the pre-stored requests. This amounts to the first stage of comparison. If, for example, the parameters such as protocol name, protocol ID, type of request, and index of the received request matches with the corresponding parameters such as protocol name, protocol ID, type of request, and index of the pre-stored requests, then the device parameter processing module 412 is configured for retrieving the matched pre-stored request along with the corresponding pre-stored response for the received request from the industrial communication database 408. In any case, all the parameters included in the received request are to not match with all the parameters with the pre-stored requests. Hence, those parameters that remain constant during every communication between the industrial application 114 and the industrial device 108 are considered for mapping or comparison. Alternatively, the determination of whether the received request matches with at least one of the pre-stored requests may be done using search key (e.g., parameter names such as protocol ID, type of request, data set address and the like).

In contrast, if it is determined that the received request fails to match with the at least one pre-stored request, then the device parameter processing module 412 is configured to forward the received request with a message "new request" to the industrial communication database 408. The industrial communication database 408 understands that the received request is not pre-stored and is a new request. The industrial communication database 408 then stores the received request and notifies the display module 416 regarding the newly stored request.

Further, once the matched pre-stored request having the same one or more parameters as that of the received request is retrieved, the device parameter processing module 412 is configured for identifying one or more modified parameter values in the received request by comparing the one or more parameter values in the received request with the one or more parameter values in the matched pre-stored request. This amounts to the second stage of comparison. This comparison provides a list of parameters included in the matched pre-stored request having values that are not matching with the corresponding list of parameters included in the received request. The one or more modified parameters may include sequence number, activity ID, session ID, sequence number, session key, index, and the like. The one or more modified parameters may include other parameters not described herein, but are known to a person skilled in the art. An exemplary list of modified parameters is given below in Table 3:

TABLE 3

Exemplary list of modified parameters sequenceNo; byte[4]; byte location 1; value
activityID; byte[16]; bytelocation 2; 0x00, 0x00, 0xa0, 0xde; 0x97..
pnioUUID; byte[16]; bytelocation 3; value 1
index; byte[2]; bytelocation 3; value 2
controlcommand; byte[2]; bytelocation 3; value 3;
arBlockReq; byte[2]; bytelocation 3; value 4
aruuid; byte[16]; bytelocation 3; value 5
object uuid; byte[16]; bytelocation 3; value 6
object338; byte[16]; bytelocation 3; 0x00, 0x00, 0x00, 0xa0, 0xde; 0x97..
floor1_UUID; byte[16]; bytelocation 3; value 7
iosequenceNumber; byte[2]; bytelocation 3; value 8
session_key; byte[2]; bytelocation 3; value 9

In an embodiment, the list of one or more modified parameter values is dynamic and keeps changing for every request received from the industrial application 114. Once the one or more modified parameter values in the received request are identified, the device parameter processing module 412 forwards the one or more modified parameter values to the data packet generating module 414. For example, the device parameter processing module 412 forwards the corresponding byte address, length, and value of the one or more modified parameters to the data packet generating module 414.

The data packet generating module 414 is configured for generating a response for the received request by modifying the pre-stored response based on the identified one or more modified parameter values. Upon receiving the one or more modified parameter values, the corresponding one or more parameter values in the pre-stored response are modified. For example, if the modified parameter value for parameter Sequence number is 'x', then the corresponding parameter value of parameter Sequence number in the pre-stored response is changed to 'x'. Similarly, if the modified parameter value for parameter session ID is 'y', then the corresponding parameter value of parameter session ID in the pre-stored response is changed to 'y'. Upon modifying all such corresponding parameters in the pre-stored response, the data packet generating module 414 generates the response for the received request. The modification of all such corresponding parameters provides successful communication of the virtual industrial device(s) 116A-N with the industrial application 114. The data packet generating module 414 then forwards the generated response to the communication module 410.

In another embodiment, the data packet generating module 414 may also determine whether there are any user-defined parameters that are to be modified in the pre-stored response along with the identified one or more parameter values. If there are any user-defined parameters, then the data packet generating module 414 first determines dataset address and type of response for which the user-defined parameters are received. Then, the data packet generating module 414 identifies the corresponding pre-stored response having the same dataset address and type. Further, the data packet generating module 414 is then configured for modifying the pre-stored response based on user-defined parameters and the identified one or more modified parameters and then generating the response for the received request, where the response includes one or more modified parameters and the user-defined parameters. The user-defined parameters include one or more parameters associated with device data present in the pre-stored response. For example, the user-defined parameters include parameter values to change, byte location, name of fault, response type, and length associated with specific parameters. This embodiment enables the user at the industrial application 114 to generate specific scenarios such as hardware faults and so on.

The above process of generating the response is described for PROFINET communication. However, the same process of generating the response may be applied for any other known communication protocols. For example, in case of a serial communication, the pre-stored response is itself transmitted to the industrial application 114 without any modification of the parameters, as there shall be no parameters that are modified in the corresponding request.

The communication module 410 is then configured for transmitting the generated response to the industrial application 114 via the industrial network 106. The response is transmitted to the industrial application 114 via the same port number on which the request is received.

Figure 10A:
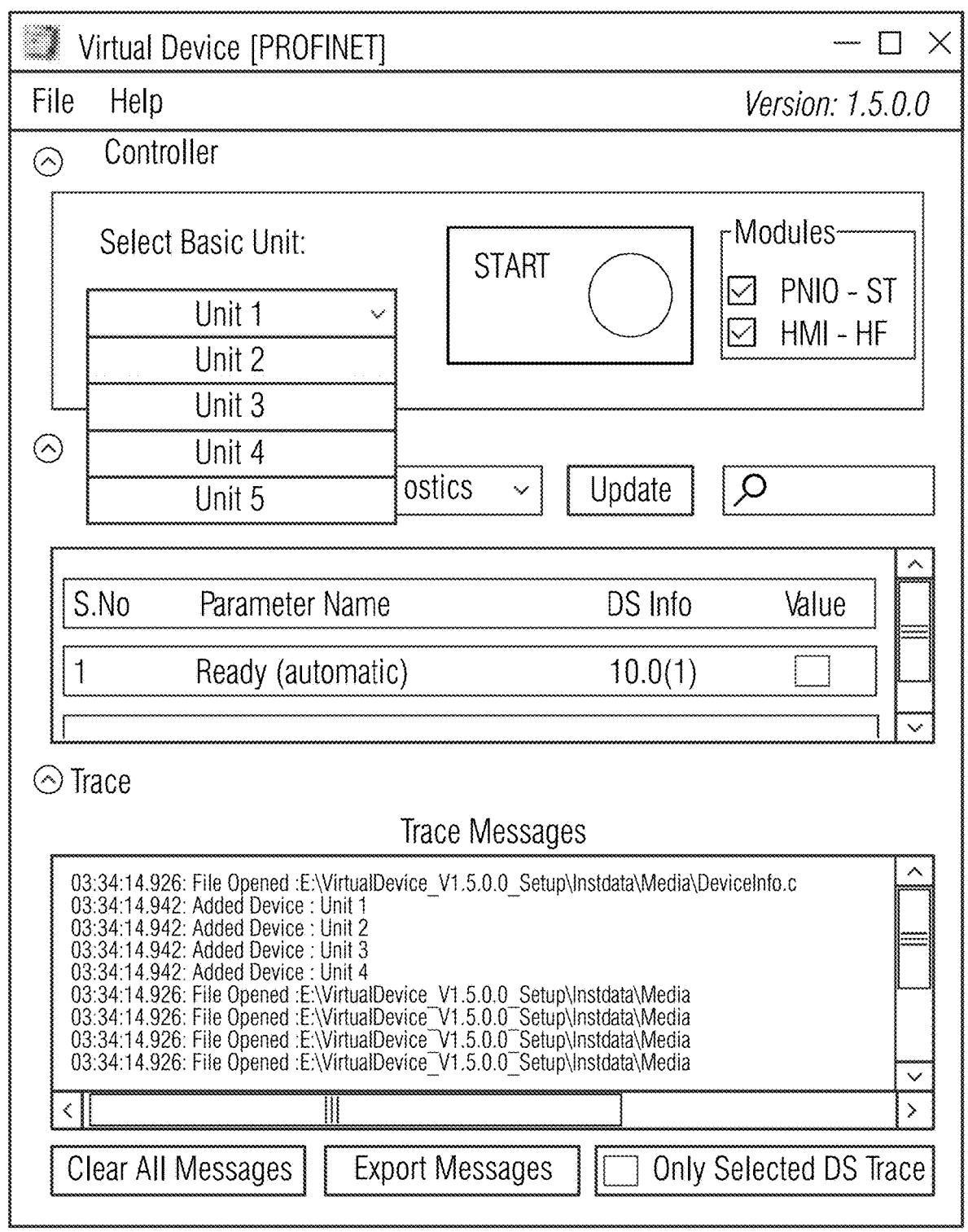
FIGS. 10A-B show a screenshot view of a graphical user interface of a testing system that enables a user to generate and manage the virtual industrial devices in the industrial network.
Figure 10B:
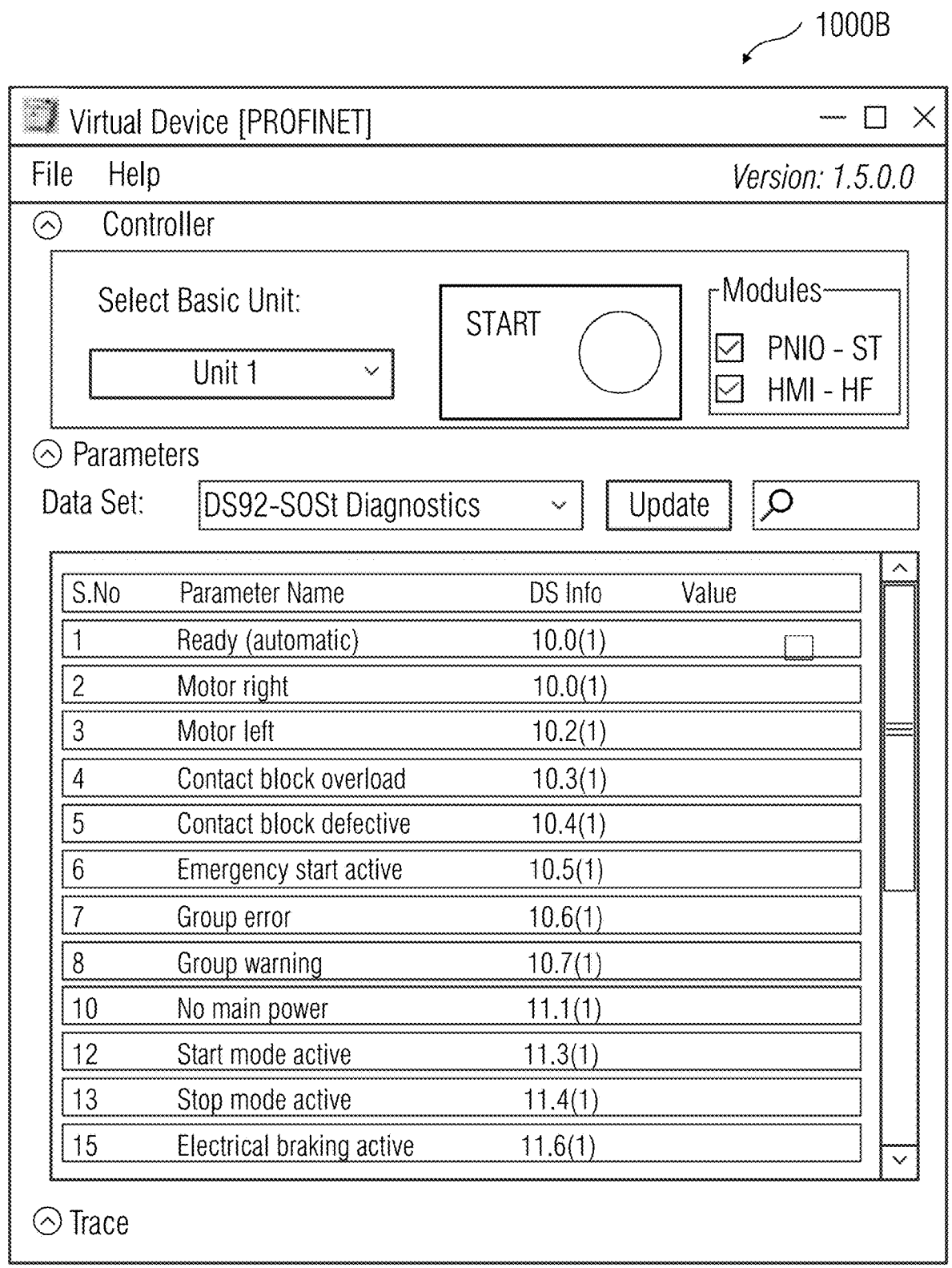

The display module 416 is configured for outputting a notification on a user interface when a new request is received from the industrial application 114 and is stored in the industrial communication database 408. The notification indicates that the received request is stored in the industrial communication database 408. In an embodiment, the notification may be in the form of an email message, an alert window, signal information, a text message, and the like. The user interface interacts with the user enabling the user to generate faults and provide user-defined parameters. An exemplary graphical user interface is shown in FIGS. 10A-10B.

Figure 5:
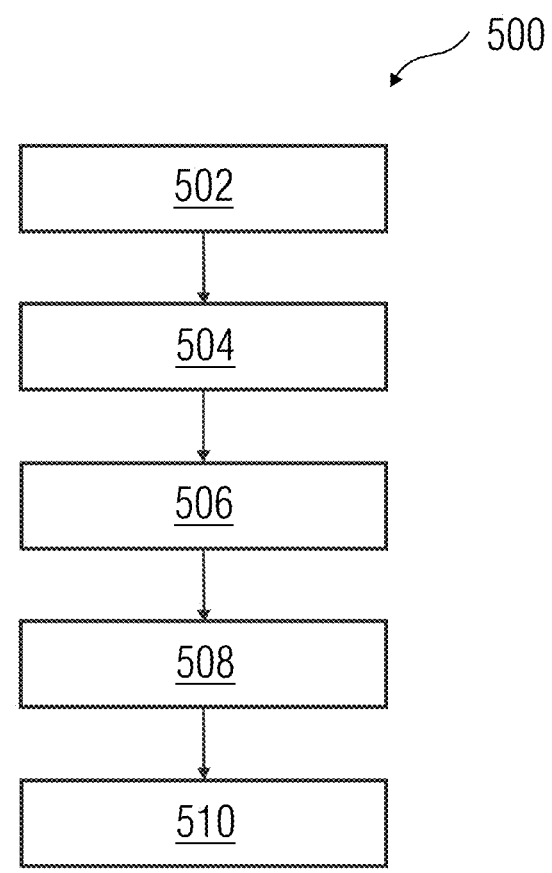
FIG. 5 is a process flowchart illustrating an exemplary method of generating and managing virtual industrial devices in an industrial network, according to the embodiment.

FIG. 5 is a process flowchart illustrating an exemplary method 500 of generating and managing virtual industrial devices 116A-N in an industrial network 106, according to the embodiment of the present disclosure. At act 502, data packets associated with an ongoing industrial communication in the industrial network between an industrial application 114 and an industrial device 108 is captured. In an embodiment, the industrial device 108 may be an industrial controlling/monitoring device or an industrial field device. In an embodiment, the industrial application 114 may be an automation engineering application running on an engineering system 104. At act 504, the captured data packets are segregated into one or more requests and the one or more responses by analyzing information included in the data packets. The information included in the data packets includes type of data packet, packet identifier (ID), session identifier (ID), sequence number, index, and one or more parameters associated with the data packets. At act 506, the one or more requests along with the one or more responses for the ongoing industrial communication are stored in a memory, such as the industrial communication database 408. While storing the one or more requests along with the one or more responses, a communication library is generated.

The communication library stores the one or more requests along with the one or more responses for each industrial device 108 in communication with the industrial application 114. At act 508, a virtual industrial device 116A-N emulating the industrial device 108 is dynamically generated based on the stored one or more requests and the stored one or more responses. While dynamically generating the virtual industrial devices 116A-N, device configuration information associated with the industrial device 108 is obtained from the one or more requests and the one or more responses, and then, the virtual industrial device(s) 116A-N is dynamically generated to emulate as the industrial device 108 based on the obtained device configuration information. At act 510, a communication session between the generated virtual industrial devices 116A-N and the industrial application 114 is established for performing one or more test operations on the generated virtual industrial devices 116A-N. The one or more test operations includes generating faults for the industrial device 108, testing one or more scenarios for the industrial device 108, and controlling parameters associated with the industrial device 108.

Figure 6:
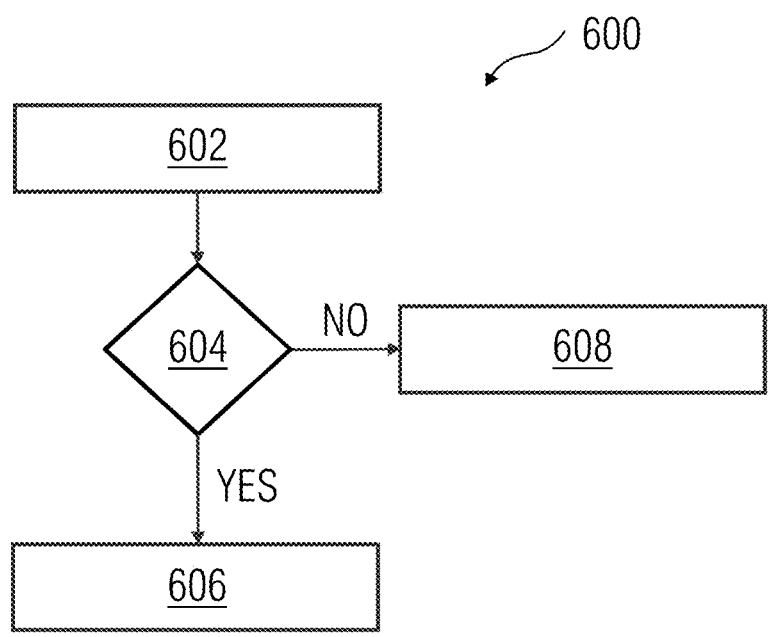
FIG. 6 is a process flowchart illustrating an exemplary method of establishing a communication session between generated virtual industrial devices and industrial application for performing the one or more test operations on the generated virtual industrial devices, according to the embodiment.

FIG. 6 is a process flowchart illustrating an exemplary method 600 of establishing a communication session between generated virtual industrial devices 116A-N and industrial application 114 for performing the one or more test operations on the generated virtual industrial devices 116A-N, according to the embodiment of the present disclosure. At act 602, a port number in the request is identified for establishing communication with the industrial application 114. At act 604, it is determined whether the ongoing industrial communication between the industrial device 108 and the industrial application 114 is complete. If it is determined that the ongoing industrial communication between the industrial device 108 and the industrial application 114 is complete, then at act 606, the communication session between the generated virtual industrial devices 116A-N and the industrial application 114 is established. If it is determined that the ongoing industrial communication between the industrial device 108 and the industrial application 114 is not complete, then at act 608, the ongoing industrial communication between the industrial device 108 and the industrial application 114 is terminated before establishing the communication session between the generated virtual industrial devices 116A-N and the industrial application 114.

Figure 7:
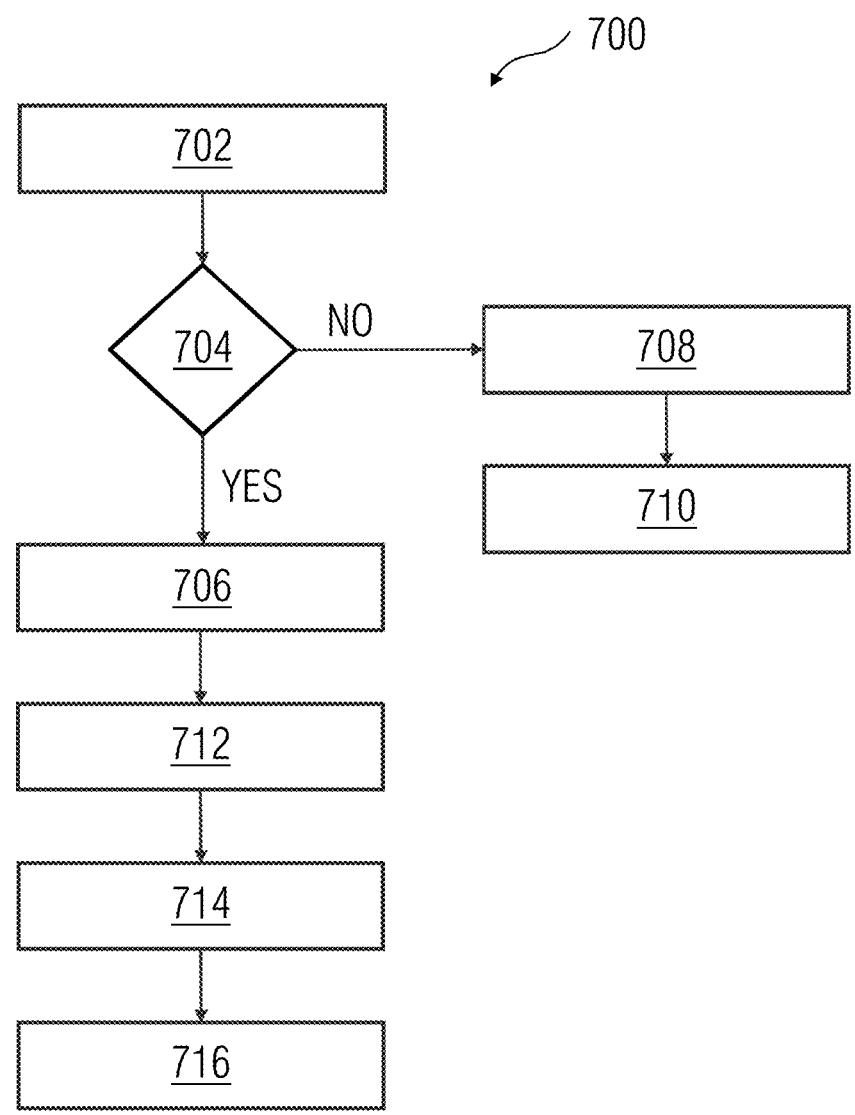
FIG. 7 is a process flowchart illustrating an exemplary method of generating and managing virtual industrial devices in an industrial network, according to another embodiment.

FIG. 7 is a process flowchart illustrating an exemplary method 700 of generating and managing virtual industrial devices 116A-N in an industrial network 106, according to another embodiment of the present disclosure. At act 702, it is determined whether a request is received from the industrial application 114. The request is received on a specific port number, and the request includes one or more parameters. At act 704, it is determined whether the received request matches with at least one pre-stored requests based on the one or more parameters included in the received request. If it is determined that the received request matches with at least one pre-stored requests, then at act 706, the matched pre-stored request is retrieved along with the corresponding pre-stored response for the received request from a memory, such as the industrial communication database 408. Further, at act 712, one or more modified parameters in the received request are identified by comparing the one or more parameters in the received request with the one or more parameters in the matched pre-stored request. The one or more modified parameters includes an activity identifier, a session identifier, the port number, a sequence number, a protocol name, a protocol ID, type of request, data length, and index. At act 714, a response for the received request is generated by modifying the pre-stored response based on the identified one or more modified parameters. In case of user-defined parameters, the pre-stored response is modified based on user-defined parameters and the identified one or more modified parameters, and then, the response is generated for the received request. The response includes one or more modified parameters and the user-defined parameters. The user-defined parameters include one or more parameters associated with device data present in the pre-stored response. At act 716, the generated response is transmitted to the industrial application 114 via the industrial network 106. The response is transmitted via the specific port number.

Alternatively, if it is determined that the received request does not match with the at least one pre-stored requests, then at act 708, the received request is stored in the memory, such as the industrial communication database 408. At act 710, a notification is outputted on a user interface, where the notification indicates that the received request is stored in the memory, such as the industrial communication database 408.

Figure 8:
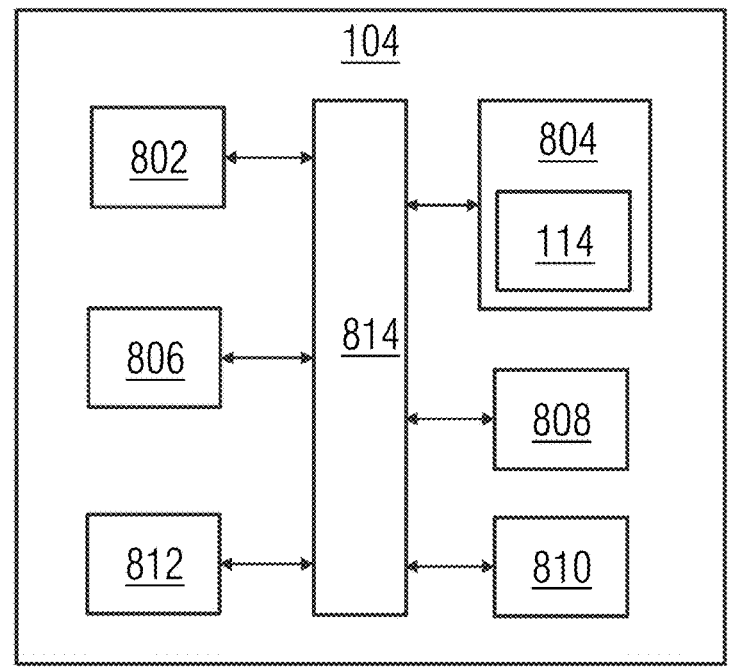
FIG. 8 is a block diagram of an engineering system, such as those shown in FIG. 1, showing various components to implement embodiments of the present disclosure.

FIG. 8 is a block diagram of an engineering system 104, such as those in shown in FIG. 1, showing various components to implement embodiments of the present disclosure. The engineering system 104 includes one or more processors 802 (e.g., a processor), one or more memories 804 (e.g., a memory), a storage unit 806, a communication interface 808, an input/output unit 810, a display unit 812, and a bus 814.

The processor 802, as used herein, may be one or more processing units (e.g., servers) capable of processing data packets from the industrial device 104 and the testing system 102. The processor 802 may also include embedded controllers, such as generic or programmable logic devices or arrays, application specific integrated circuits, or FPGAs and the like. The memory 804 may be volatile memory and non-volatile memory. The memory 804 includes an industrial application 114 for managing virtual industrial devices 116A-N in a virtual test environment 110, according to one or more embodiments described herein. Memory elements may include any suitable memory devices for storing data and machine-readable instructions. The storage unit 806 may store the device configuration information associated with one or more industrial devices 108. The communication interface 808 is configured for communicating with the industrial device 108 and the virtual industrial devices 116A-N through a specific port number. The description for the components such as an input/output unit 810 and the bus 814 is omitted, as the description for the components is known to a person skilled in the art. The display unit 812 is configured for displaying the modified information associated with the virtual industrial devices 116A-N on a user interface. An exemplary user interface is shown in FIGS. 11A-B.

Figure 9:
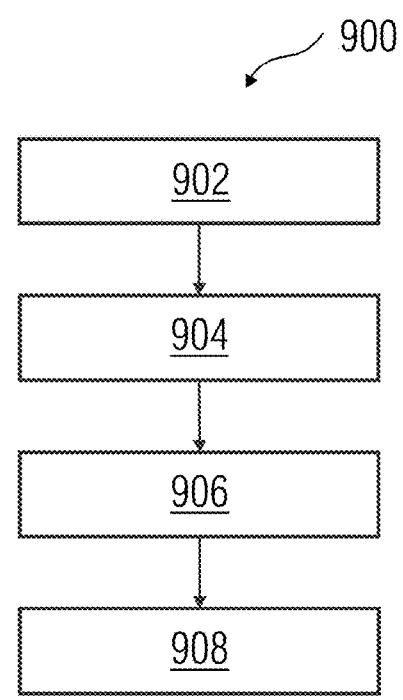
FIG. 9 is a process flowchart illustrating an exemplary method of managing virtual industrial devices in an industrial network, according to an embodiment.

FIG. 9 is a process flowchart illustrating an exemplary method 900 of managing virtual industrial devices 116A-N in an industrial network 106, according to an embodiment of the present disclosure. At act 902, a response from a virtual industrial device 116A-N is received via an industrial network 106. At act 904, one or more parameters included in the response are analyzed. At act 906, information associated with the virtual industrial devices 116A-N is modified based on the analyzed one or more parameters. At act 908, the modified information associated with the virtual industrial devices 116A-N is displayed on a user interface.

FIGS. 10A-B show a screenshot view of a graphical user interface of a testing system 102 that enables a user to generate and manage the virtual industrial devices 116A-N in the industrial network 106. FIG. 10A depicts a GUI of an exemplary virtual test environment 110. A drop-down menu enables the user to select the dynamically generated virtual industrial devices 116A-N, such as device 1, device 2 and so on to generate and test various scenarios. Multiple virtual industrial devices 116A-N are generated and stored, each emulating corresponding industrial device 108. A parameter interface is also provided beneath the drop down menu that displays the necessary parameter name, diagnostic information, and the corresponding value. This interface also allows the user to input the "user-defined parameters" to generate specific test scenarios without requiring the actual hardware/industrial device 108. Further, a trace message UI is provided for displaying the communication status of the selected virtual industrial devices 116A-N with the industrial application 114. Any error or bug is also displayed in this interface so as to enable the user to identify connection status. Similarly, FIG. 10B depicts a user interface, where a virtual industrial device 116A-N is selected and for which various parameters are depicted. A user is allowed to change any of these parameters by clicking the option "update". Further, a user is also allowed to input search keys for identifying similar parameters which are pre-stored.

Figure 11A:
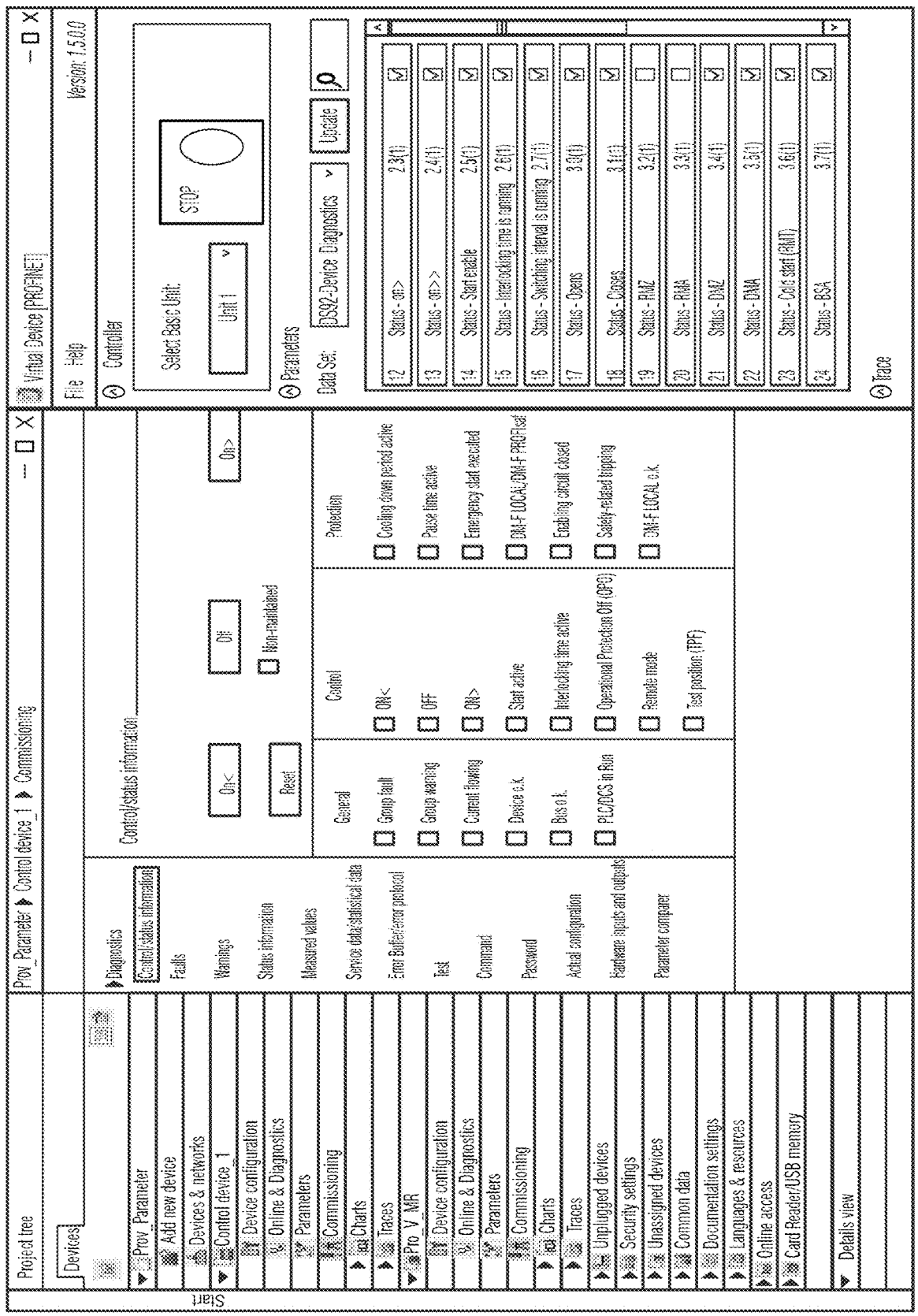
Figure 11B:
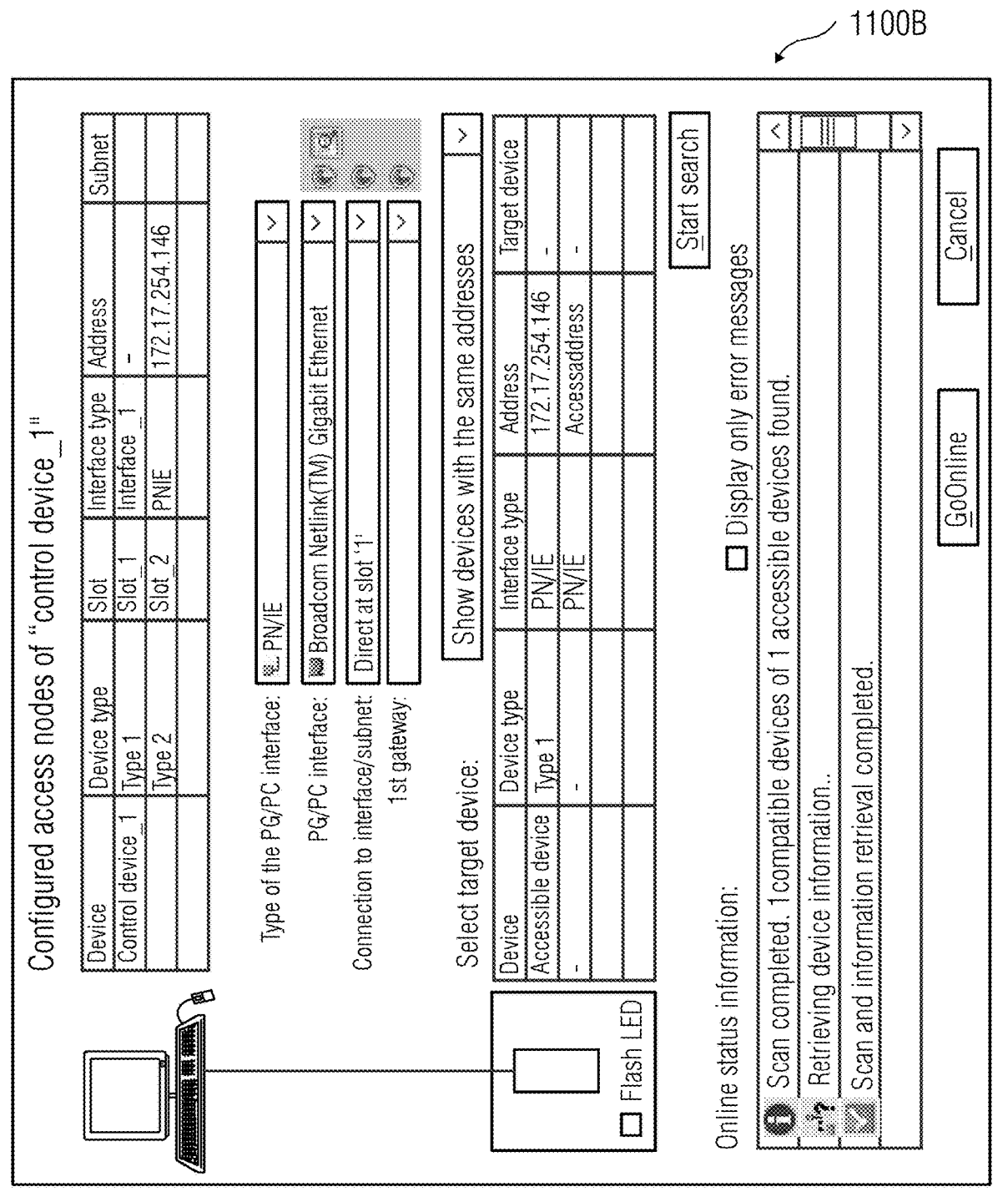

FIGS. 11A-B show a screenshot view of a graphical user interface of an engineering system 104 that enables a user to manage the virtual industrial devices 116A-N in the industrial network 106. In FIG. 11A, the GUI 1100a includes control/status information for a particular industrial device 108, such as, for example, SIMOCODE. During the process of communication between the industrial application 114 and the generated virtual industrial device(s) 116A-N, the industrial application 114 does not know whether the industrial application 114 is communicating with the actual industrial device 108 or the virtual industrial devices 116A-N, as the virtual industrial devices 116A-N generated behave as the actual industrial device 108. This reduces the dependency of a user at the industrial application 114 to actually rely on an actual industrial device 108 for carrying out various tests. At the GUI 1100a, diagnostic information including status information, faults, warnings, measured events, test, command, and other information specific to selected industrial device 108 is provided. A corresponding GUI on the virtual test environment 110 is depicted on the right hand side, which has consistent diagnostic information for the same selected virtual industrial device 116A-N acting as the industrial device 108. In FIG. 11B, various interfaces are provided, enabling the user to select the type of device on which the user wishes to conduct test runs and select appropriate interfaces. When all this information is input by the user, the online status information displays the connection status of the industrial application 114 with the selected target device, such as the virtual industrial devices 116A-N.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating and managing one or more virtual industrial devices in an industrial network, the method comprising:
    capturing, by a processor, data packets associated with an ongoing industrial communication in the industrial network between an industrial application and an industrial device;
    segregating, by the processor, the captured data packets into one or more requests and corresponding one or more responses, the segregating of the captured data packets comprising analyzing information comprised in the data packets;
    storing, by the processor, the one or more requests along with the corresponding one or more responses for the ongoing industrial communication in a memory;
    determining, by the processor, a type of the industrial device, based on one or more parameters of the data packets;
    dynamically generating, by the processor, the one or more virtual industrial devices emulating the industrial device based on the stored one or more requests and the stored corresponding one or more responses, and further based on the determination of the type of the industrial device;
    establishing, by the processor, a communication session between the dynamically generated one or more virtual industrial devices and the industrial application for performing one or more test operations on the dynamically generated one or more virtual industrial devices; and
    generating, by the processor, a plurality of test scenarios relevant for the industrial device, wherein the plurality of test scenarios is generated based on the dynamically generated one or more virtual industrial devices emulating the industrial device.

2. The method of claim 1, wherein the one or more test operations comprise generating faults for the industrial device, testing one or more scenarios for the industrial device, and controlling parameters associated with the industrial device.

3. The method of claim 1, wherein the information comprised in the data packets comprises type of data packet, packet identifier (ID), session identifier (ID), sequence number, index, and one or more parameters associated with the data packets.

4. The method of claim 1, wherein the industrial device comprises an industrial field device, industrial controlling device, or the industrial field device and the industrial controlling device.

5. The method of claim 1, wherein dynamically generating the one or more virtual industrial devices for the industrial device based on the stored one or more requests and the stored corresponding one or more responses comprises:
    obtaining device configuration information associated with the industrial device from the stored one or more requests and the stored corresponding one or more responses; and
    dynamically generating the one or more virtual industrial devices to emulate as the industrial device based on the obtained device configuration information.

6. The method of claim 1, wherein storing the one or more requests along with the corresponding one or more responses for the ongoing industrial communication in the memory further comprises:
generating a communication library for storing the one or more requests along with the corresponding one or more responses in the memory,
wherein the communication library stores the one or more requests along with the corresponding one or more responses for each industrial device in communication with the industrial application.

7. The method of claim 1, wherein establishing the communication session between the dynamically generated one or more virtual industrial devices and the industrial application for performing the one or more test operations on the dynamically generated one or more virtual industrial devices comprises:
identifying a port number in the respective request for establishing the communication session with the industrial application;
determining whether the ongoing industrial communication between the industrial device and the industrial application is complete; and
establishing the communication session between the dynamically generated one or more virtual industrial devices and the industrial application when the ongoing industrial communication between the industrial device and the industrial application is complete.

8. The method of claim 7, wherein determining whether the ongoing industrial communication between the industrial device and the industrial application is complete comprises:
terminating the ongoing industrial communication between the industrial device and the industrial application before establishing the communication session between the dynamically generated one or more virtual industrial devices and the industrial application.

9. The method of claim 1, further comprising:
determining whether a request is received from the industrial application, wherein the request is received on a specific port number, and wherein the request comprises one or more parameters;
determining whether the received request matches with at least one pre-stored request based on the one or more parameters comprised in the received request;
retrieving the at least one matched pre-stored request along with a corresponding pre-stored response for the received request from a memory;
identifying one or more modified parameters in the received request, the identifying of the one or more modified parameters comprising comparing the one or more parameters in the received request with the one or more parameters in the matched pre-stored request;
generating a response for the received request, the generating of the response for the received request comprising modifying the pre-stored response based on the identified one or more modified parameters; and
transmitting the generated response to the industrial application via the industrial network, wherein the response is transmitted via the specific port number.

10. The method of claim 9, wherein determining whether the received request matches with at least one pre-stored request comprises:
storing the received request in the memory when the received request fails to match with the at least one pre-stored request; and
outputting a notification on a user interface, wherein the notification indicates that the received request is stored in the memory.

11. The method of claim 9, wherein generating the response for the received request by modifying the pre-stored response based on the identified one or more modified parameters comprises:
modifying the pre-stored response based on user-defined parameters and the identified one or more modified parameters; and
generating the response for the received request, wherein the response comprises one or more modified parameters and the user-defined parameters.

12. The method of claim 11, wherein the user-defined parameters comprise one or more parameters associated with device data present in the pre-stored response.

13. The method of claim 9, wherein the one or more modified parameters comprise an activity identifier, a session identifier, the port number, a sequence number, a protocol name, a protocol ID, a type of request, data length, index, or any combination thereof.

14. The method of claim 1, further comprising:
receiving, by the processor, a response from a virtual industrial device of the one or more virtual industrial devices via the industrial network;
analyzing, by the processor, one or more parameters comprised in the received response;
modifying, by the processor, information associated with the virtual industrial device based on the analyzed one or more parameters; and
displaying, by the processor, the modified information associated with the virtual industrial device on a user interface.

15. An apparatus for generating and managing one or more virtual industrial devices in an industrial network, the apparatus comprising:
a processor; and
a memory coupled to the processor, wherein the memory comprises a virtual industrial device management module stored in the form of machine-readable instructions executable by the processor, wherein the virtual industrial device management module is configured to generate and manage one or more virtual industrial devices in an industrial network, the generation and management of the one or more virtual industrial devices comprising:
capture, by the processor, of data packets associated with an ongoing industrial communication in the industrial network between an industrial application and an industrial device;
segregation, by the processor, of the captured data packets into one or more requests and corresponding one or more responses, the segregation of the captured data packets comprising analyzation of information comprised in the data packets;
determination, by the processor, a type of the industrial device, based on one or more parameters of the data packets;
storage, by the processor, of the one or more requests along with the corresponding one or more responses for the ongoing industrial communication in a memory;
dynamic generation, by the processor, of the one or more virtual industrial devices emulating the industrial device based on the stored one or more requests and the stored corresponding one or more responses, and further based on the determination of the type of the industrial device;

establishment, by the processor, of a communication session between the dynamically generated one or more virtual industrial devices and the industrial application for performance of one or more test operations on the dynamically generated one or more virtual industrial devices; and generation, by the processor, of a plurality of test scenarios relevant for the industrial device, wherein the plurality of test scenarios is generated based on the dynamically generated one or more virtual industrial devices emulating the industrial device.

16. An industrial communication system for generating and managing one or more virtual industrial devices in an industrial network, the industrial communication system comprising:

an apparatus for generating and managing the one or more virtual industrial devices in the industrial network, the apparatus comprising:

a processor; and a memory coupled to the processor, wherein the memory comprises a virtual industrial device management module stored in the form of machine-readable instructions executable by the processor, wherein the virtual industrial device management module is configured to generate and manage one or more virtual industrial devices in an industrial network, the generation and management of the one or more virtual industrial devices comprising:

capture, by the processor, of data packets associated with an ongoing industrial communication in the industrial network between an industrial application and an industrial device;

segregation, by the processor, of the captured data packets into one or more requests and corresponding one or more responses, the segregation of the captured data packets comprising analyzation of information comprised in the data packets;

storage, by the processor, of the one or more requests along with the corresponding one or more responses for the ongoing industrial communication in a memory;

determination, by the processor, of a type of the industrial device, based on one or more parameters of the data packets;

dynamic generation, by the processor, of the one or more virtual industrial devices emulating the industrial device based on the stored one or more requests and the stored corresponding one or more responses, and further based on the determination of the type of the industrial device;

establishment, by the processor, of a communication session between the dynamically generated one or more virtual industrial devices and the industrial application for performance of one or more test operations on the dynamically generated one or more virtual industrial devices; and generation, by the processor, of a plurality of test scenarios relevant for the industrial device, wherein the plurality of test scenarios is generated based on the dynamically generated one or more virtual industrial devices emulating the industrial device;

an engineering system for managing the one or more virtual industrial devices in the industrial network, the engineering system comprising:

a memory; and a processor coupled to the memory, wherein the processor is configured to perform:

management of the one or more virtual industrial devices in the industrial network, the management of the one or more virtual industrial devices comprising:

receipt of a response from a virtual industrial device of the one or more virtual industrial devices via the industrial network;

analysis of one or more parameters comprised in the received response;

modification of information associated with the virtual industrial device based on the analyzed one or more parameters; and display of the modified information associated with the virtual industrial device on a user interface; and an industrial device communicatively coupled to the engineering system via the industrial network.

17. A transitory computer-readable storage medium that stores instructions executable to generate and manage one or more virtual industrial devices in an industrial network, the instructions comprising:

capturing, by a processor, data packets associated with an ongoing industrial communication in the industrial network between an industrial application and an industrial device;

segregating, by the processor, the captured data packets into one or more requests and corresponding one or more responses, the segregating of the captured data packets comprising analyzing information comprised in the data packets;

storing, by the processor, the one or more requests along with the corresponding one or more responses for the ongoing industrial communication in a memory;

determining, by the processor, a type of the industrial device, based on one or more parameters of the data packets;

dynamically generating, by the processor, the one or more virtual industrial devices emulating the industrial device based on the stored one or more requests and the stored corresponding one or more responses, and further based on the determination of the type of the industrial device;

establishing, by the processor, a communication session between the dynamically generated one or more virtual industrial devices and the industrial application for performing one or more test operations on the dynamically generated one or more virtual industrial devices; and generating, by the processor, a plurality of test scenarios relevant for the industrial device based, wherein the plurality of test scenarios is generated on the dynamically generated one or more virtual industrial devices emulating the industrial device.

* * * * *